US012610932B2

(12) United States Patent
Kobayashi

(10) Patent No.: US 12,610,932 B2
(45) Date of Patent: Apr. 28, 2026

(54) SINKER FOR UNDERWATER MOBILE BODY OR SINKER FOR FISHING TACKLE

(71) Applicant: Yasuo Kobayashi, Hunabashi (JP)

(72) Inventor: Yasuo Kobayashi, Hunabashi (JP)

( * ) Notice: Subject to any disclaimer, the term of this patent is extended or adjusted under 35 U.S.C. 154(b) by 0 days.

(21) Appl. No.: 18/553,993

(22) PCT Filed: Apr. 14, 2021

(86) PCT No.: PCT/JP2021/016108
§ 371 (c)(1),
(2) Date: Oct. 5, 2023

(87) PCT Pub. No.: WO2022/219826
PCT Pub. Date: Oct. 20, 2022

(65) Prior Publication Data
US 2024/0188551 A1 Jun. 13, 2024

(51) Int. Cl.
A01K 95/00 (2006.01)
(52) U.S. Cl.
CPC .................................... A01K 95/00 (2013.01)
(58) Field of Classification Search
CPC .............................. A01K 95/00; A01K 95/005
See application file for complete search history.

(56) References Cited

FOREIGN PATENT DOCUMENTS

JP 2019-68780 A 5/2019

*Primary Examiner* — Richard G Davis
(74) *Attorney, Agent, or Firm* — HDLS IPR SERVICES; Chun-Ming Shih

(57) ABSTRACT

The present disclosure aims to provide a sinker which keeps a main body of an underwater mobile body or a main body of a fishing tackle at a constant height range from a water bottom regardless of the water depth, wherein a force of pulling the main body downward is adjusted more sharply and/or more quickly in accordance with ups and downs of the water bottom, as well as the sinker snags more hardly on obstacles, and also aims to provide an entanglement prevention structure which prevents the above described type of sinker from getting entangled, as well as which is stowed easily even when mounted. The present disclosure provides a sinker 100 whose mass per unit length varies or a sinker 300 which is configured locally with an 10 unbendable component. In addition, the present disclosure provides a structure 400 of the sinker including a connection portion 400*a* attached to the main body and an arm portion 400*b* protruding from the connection portion 400*a*.

9 Claims, 5 Drawing Sheets

21

3

1 a

10

11

100 b

300

300 a 20 b

3

1 a

10

11

100 b

300

300 a

3

1 a

10

11

100 b

300

20

300 a

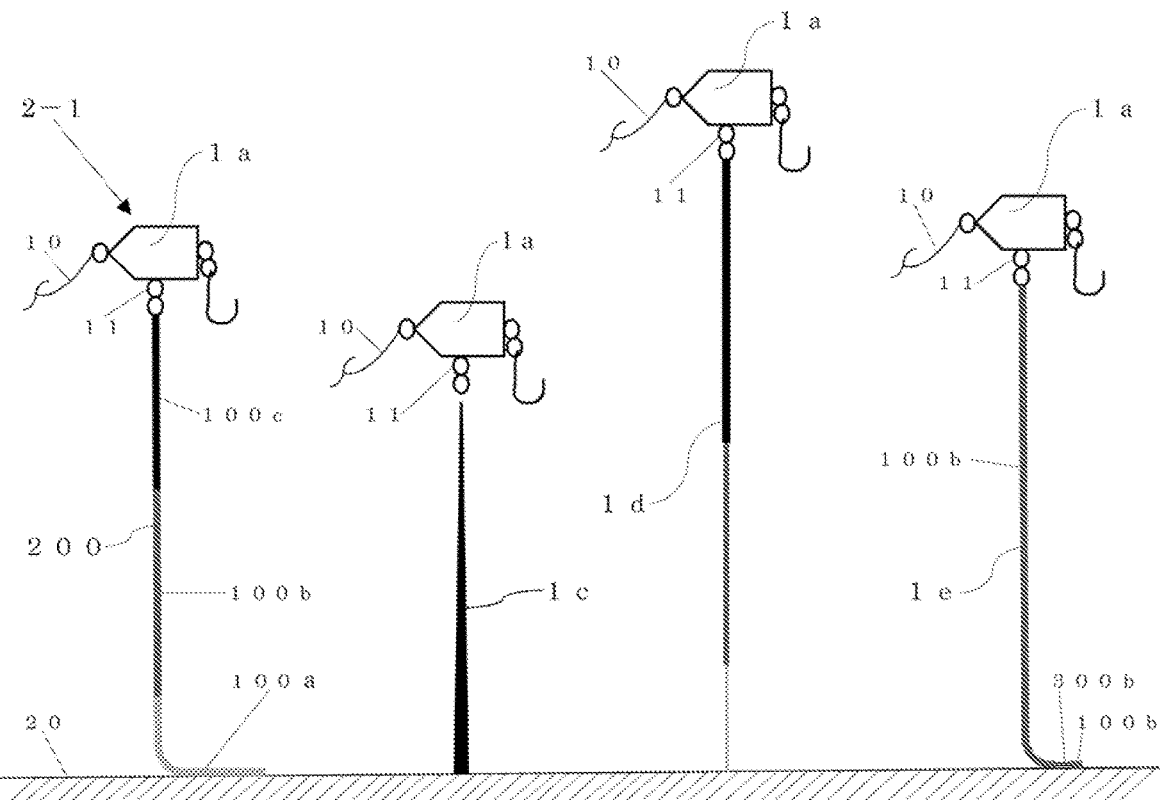
Fig. 4A      Fig. 4B      Fig. 4C      Fig. 4D

SINKER FOR UNDERWATER MOBILE BODY OR SINKER FOR FISHING TACKLE

TECHNICAL FIELD

The present disclosure relates to a sinker for an underwater mobile body to move underwater or a sinker for a fishing tackle to move underwater.

CROSS-REFERENCES TO RELATED APPLICATIONS

The present application claims the benefit of International Patent Application No. PCT/JP2021/016108, filed on Apr. 14, 2021, the subject matter of which is hereby incorporated herein by reference. The exclusionary provisos in the claims of the present application are supported by Patent Document 1, cited in the original disclosure above, whose patent holder is the applicant of the present disclosure.

BACKGROUND ART

It is conventionally known that a sinker, which keeps a main body of an underwater mobile body or a main body of a fishing tackle at a constant height range from a water bottom regardless of the water depth, whose main body is a buoyant body configured to go underwater while receiving a resistance of water (shown in Patent document 1). This type of sinker is extended downward from the main body and can be freely curved. A force of pulling the main body downward is adjusted in accordance with an amount of the sinker in contact with the water bottom.

CITATION LIST

Patent Literature

[Patent Document 1] Japanese Unexamined Patent Application Publication No. 2019-068780 (U.S. Pat. No. 6,803, 017)

SUMMARY

Technical Problem

However, in the underwater mobile body and the fishing tackle equipped with the sinker of the above described conventional technology, the force of pulling the main body downward is adjusted in accordance with the amount of the sinker in contact with the water bottom while the underwater mobile body or the fishing tackle is moving underwater. Thus, a time lag unavoidably occurs in the vertical movement of the main body with respect to ups and downs (undulations) of the water bottom. Therefore, when ups and downs of the water bottom are fine or when ups and downs of the water bottom are frequent, it is not easy to adjust to move the main body vertically following ups and downs of the water bottom faithfully. In addition, when ups and downs of the water bottom are steep, it is not easy to adjust to keep the main body at a constant height range from the water bottom.

In the above described conventional technology, since the sinker is extended thinly and can be freely curved, the sinker snags on obstacles in some cases although the frequency is reduced compared to techniques before that.

In order to solve the problems of the above described conventional technology, the present disclosure provides a sinker which keeps a main body of an underwater mobile body or a main body of a fishing tackle at a constant height range from a water bottom regardless of the water depth, wherein a force of pulling the main body downward is adjusted more sharply and/or more quickly in accordance with ups and downs of the water bottom, and the sinker snags more hardly on obstacles.

Solution to Problem

The present disclosure provides a sinker, which is extended downward from a main body of an underwater mobile body or a main body of a fishing tackle and can be freely curved, whose main body is a buoyant body configured to go underwater while receiving a resistance of water, and whose force of pulling the main body downward is adjusted in accordance with an amount of the sinker in contact with a water bottom, wherein a mass per unit length of the sinker varies continuously, intermittently, or locally in the extending direction, excluding a component for coupling the sinker to the main body of the underwater mobile body or the main body of the fishing tackle, a single type of chain including a ball shape whose mass per unit length varies repeatedly in a uniform manner in the extending direction, a sinker-release device coupled on both its upper and lower sides to cut off and leave the sinker when the sinker snags, components for coupling the sinker-release device to the sinker or the main body, a fish attractor attached from its upper end to its lower end to the sinker, and a component for attaching the fish attractor to the sinker.

In the above described case, the sinker can be configured locally with an unbendable component.

In addition, the present disclosure provides a sinker, which is extended downward from a main body of an underwater mobile body or a main body of a fishing tackle and can be freely curved, whose main body is a buoyant body configured to go underwater while receiving a resistance of water, whose force of pulling the main body downward is adjusted in accordance with an amount of the sinker in contact with a water bottom, and which is configured to separate from the water bottom when moving underwater along a flat water bottom within a suitable speed range, wherein a mass per unit length of the sinker varies continuously, intermittently, or locally in the extending direction, excluding a component for coupling the sinker to the main body of the underwater mobile body or the main body of the fishing tackle, a single type of chain including a ball shape whose mass per unit length varies repeatedly in a uniform manner in the extending direction, a sinker-release device coupled on both its upper and lower sides to cut off and leave the sinker when the sinker snags, components for coupling the sinker-release device to the sinker or the main body, a fish attractor attached from its upper end to its lower end to the sinker, and a component for attaching the fish attractor to the sinker.

In the above described case, the sinker can be configured locally with an unbendable component.

Effects of the Invention

The present disclosure can provide a sinker which keeps a main body of an underwater mobile body or a main body of a fishing tackle at a constant height range from a water bottom regardless of the water depth, wherein a force of pulling the main body downward is adjusted more sharply and/or more quickly in accordance with ups and downs of the water bottom, and the sinker snags more hardly on obstacles.

BRIEF DESCRIPTION OF THE DRAWINGS

FIG. 1A shows a state that the lure moves underwater, FIG. 1B shows a state that the same lure moves upward on a level difference, and FIG. 1C shows a state immediately after the same lure has finished moving upward on the level difference.

FIGS. 1-1A to 1-1C are schematic diagrams showing a lure of an embodiment concerning the conventional technology. FIG. 1-1A shows a state immediately before the lure same as FIGS. 1A to 1C moves downward over a level difference, FIG. 1-1B shows a state that the same lure moves downward over the level difference, and FIG. 1-1C shows a state that the same lure is landed on a water bottom.

FIG. 2A shows a state that the lure moves underwater, FIG. 2B shows a state that the same lure moves upward on a level difference, and FIG. 2C shows a state immediately after the same lure has finished moving upward on the level difference.

FIG. 3A shows a state immediately before the lure moves downward over a level difference, FIG. 3B shows a state that the same lure moves downward over the level difference, and FIG. 3C shows a state that the same lure is landed on a water bottom.

FIGS. 4A to 4D are schematic diagrams showing a sinker of a variation example of the present disclosure where the sinker for lure having a different shape is shown.

DESCRIPTION OF EMBODIMENTS

Hereafter, the preferable embodiments of the present disclosure will be explained with reference to the drawings.

Embodiment 1

Figures 1A, 1B, 1C:
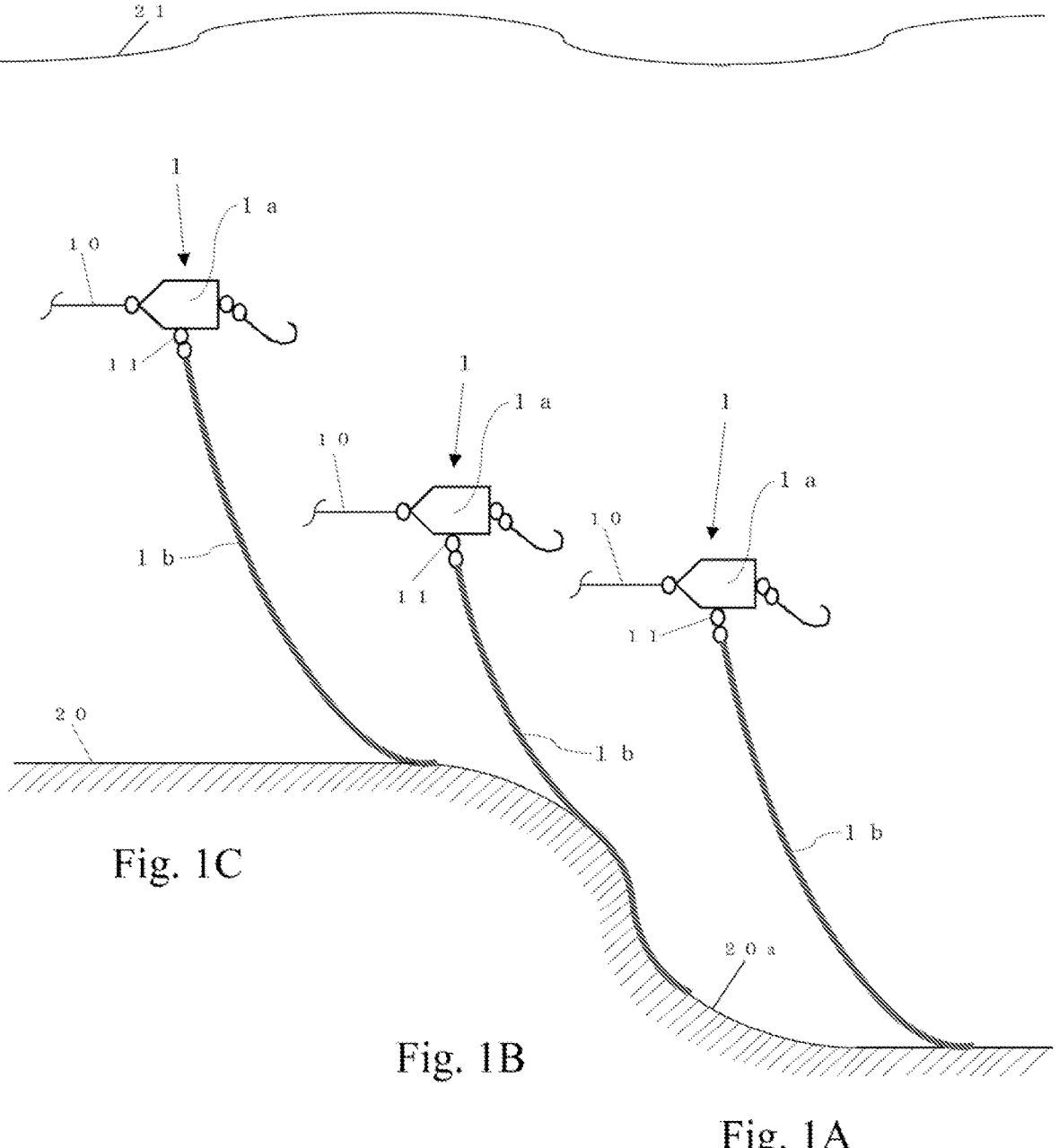
FIGS. 1A to 1C are schematic diagrams showing a lure (fishing lure) of an embodiment concerning the conventional technology.
Figures 1, 1A, 1B, 1C:
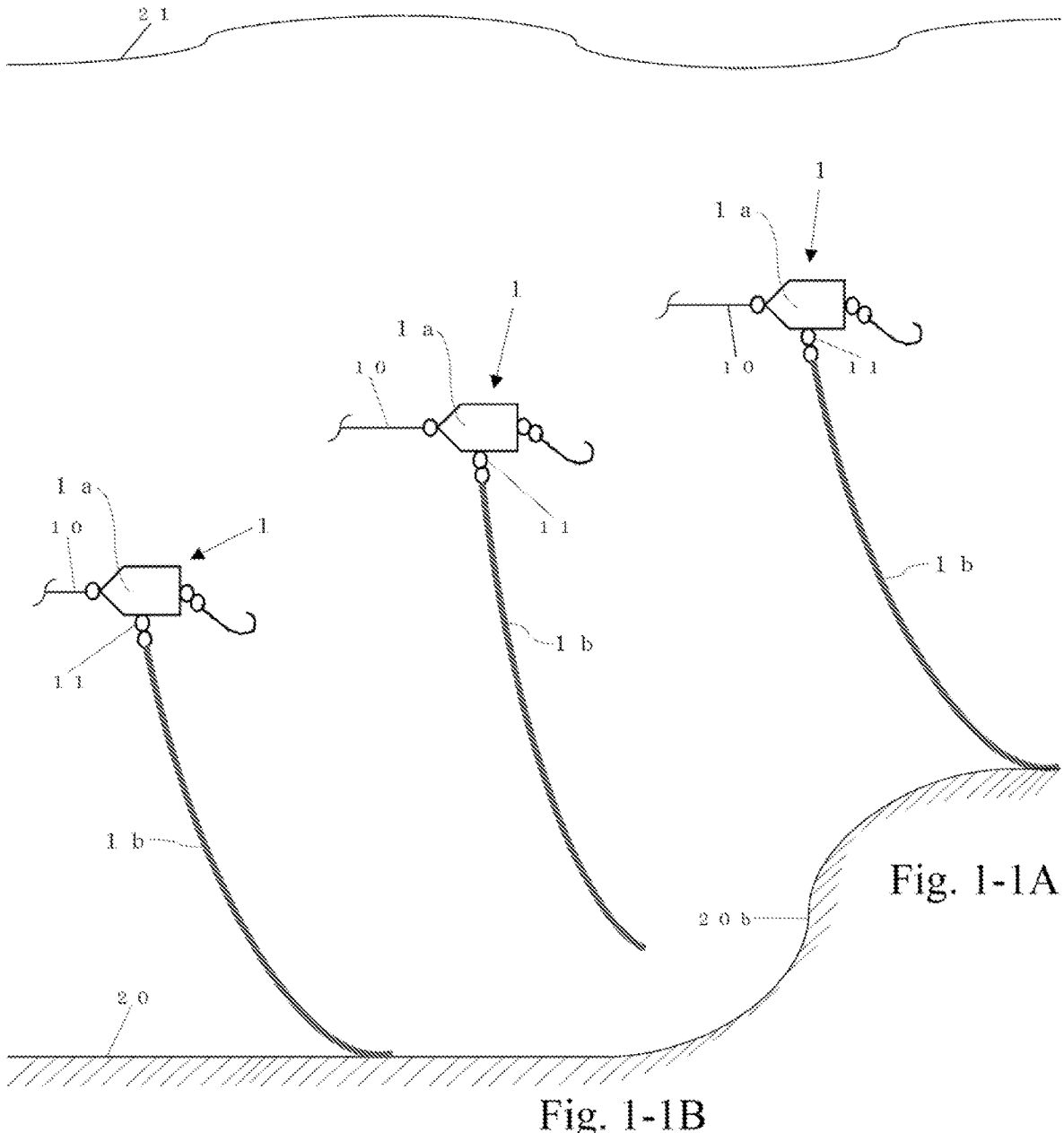

FIGS. 1A to 1C and 1-1A to 1-1C are schematic diagrams showing a lure (fishing lure) of an embodiment concerning the conventional technology. FIG. 1A shows a state that the lure moves underwater, FIG. 1B shows a state that the same lure moves upward on a level difference, and FIG. 1C shows a state immediately after the same lure has finished moving upward on the level difference. FIG. 1-1A shows a state immediately before the lure same as FIGS. 1A to 1C moves downward over a level difference, FIG. 1-1B shows a state that the same lure moves downward over the level difference, and FIG. 1-1C shows a state that the same lure is landed on a water bottom.

Hereafter, an explanation will be made about a sinker 1b of the lure (fishing tackle). A sinker 1b of a lure 1 is coupled to a main body 1a which is a buoyant body configured to go underwater while receiving a resistance of water. The sinker 1b of the lure 1 adjusts a force of pulling the main body 1a downward in accordance with an amount of the sinker 1b in contact with a water bottom to keep the main body 1a at a constant height range from the water bottom regardless of the water depth. The sinker 1b of the lure 1 is extended downward from the main body 1a and can be freely curved. As shown in FIG. 1A, FIG. 1C, FIG. 1-1A, and FIG. 1-1C, the sinker 1b is preliminarily adjusted to move underwater in a state that a certain amount of the sinker 1b is in contact with a water bottom 20 when the main body 1a is pulled approximately horizontally underwater within a suitable speed range by the fishing line 10 along a flat water bottom.

Embodiment 2

Figures 2A, 2B, 2C:
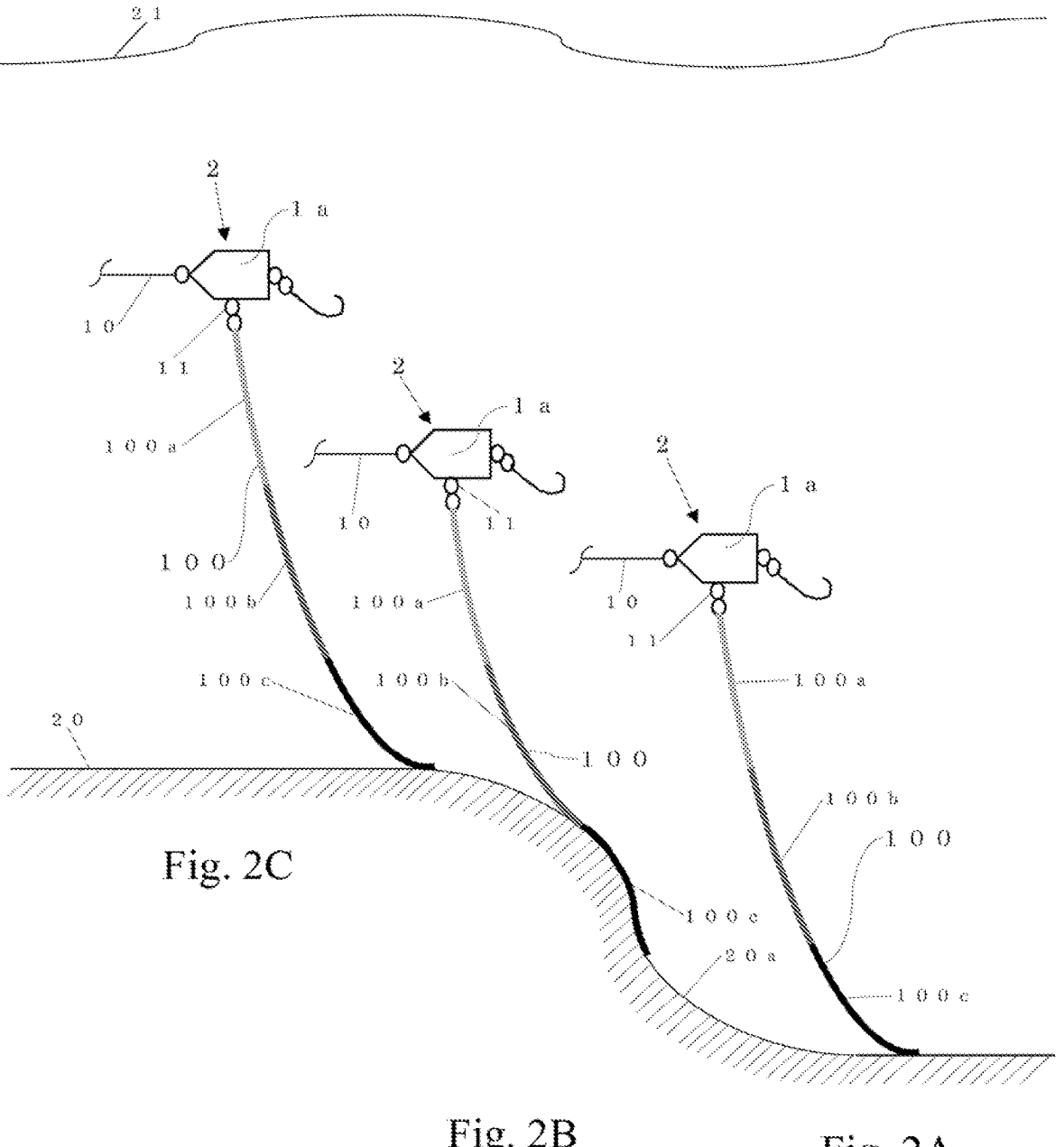
FIGS. 2A to 2C are schematic diagrams showing a lure of an embodiment of the present disclosure where only the sinker coupled to the main body of the lure shown in FIGS. 1A to 1C is replaced with a sinker whose mass per unit length is increased intermittently in the direction extending from the main body.

FIGS. 2A to 2C are schematic diagrams showing a lure of an embodiment of the present disclosure where only the sinker coupled to the main body of the lure shown in FIGS. 1A to 1C is replaced with a sinker whose mass per unit length is increased intermittently in the direction extending from the main body. FIG. 2A shows a state that the lure moves underwater, FIG. 2B shows a state that the same lure moves upward on a level difference, and FIG. 2C shows a state immediately after the same lure has finished moving upward on the level difference.

Hereafter, an explanation will be made about a sinker 100 of the lure (fishing tackle). Similar to the sinker 1b of the lure 1 of the conventional technology shown in FIGS. 1A to 1C, a sinker 100 of a lure 2 is coupled to a main body 1a, which is a buoyant body configured to go underwater while receiving a resistance of water. The sinker 100 of the lure 2 is extended downward and can be freely curved. Similar to the sinker 1b of the lure 1, the sinker 100 of the lure 2 is made of materials whose volume are hard to vary due to water pressure. A specific gravity of the sinker 100 is specified to be larger than that of the water body where the lure 2 is used. The sinker 100 of the lure 2 has enough strength not to be broken when the lure 2 is used. It is preferable to use materials as inconspicuous and quiet as possible underwater for the sinker 100. It is also possible to use a material which has an effect of attracting fish or an effect of encouraging predation due to color, luster, light reflection, sound, or the like. A sinker-release device could be provided on a ring 1 where the sinker 100 is coupled to the main body 1a or on an intermediate portion of the sinker 100 so that only the sinker 100 can be cut off and left when the sinker 100 of the lure 2 snags. Here, the sinker 100 to be released is preferably made of a material harmless to the environment.

A thickness (diameter) of a cross-section perpendicular to the extending direction of the sinker 100 of the lure 2 is equal to that of the sinker 1b of the lure 1. The entire length and the entire mass of the sinker 100 of the lure 2 are equal to those of the sinker 1b of the lure 1 also. However, the mass per unit length of the sinker 100 of the lure 2 is increased intermittently in the direction extending from the main body 1a. The mass per unit length of a sinker 100a is less (lighter) than that of the sinker 1b, the mass per unit length of a sinker 100b is equal to that of the sinker 1b, and the mass per unit length of a sinker 100c is more (heavier) than that of the sinker 1b.

Similar to the sinker 1b of the lure 1 shown in FIG. 1A, as shown in FIG. 2A, the sinker 100 of the lure 2 moves underwater in a state that a certain amount of the sinker 100 is in contact with a water bottom 20 when the main body 1a is pulled approximately horizontally underwater by the fishing line 10 along a flat water bottom at a suitable and the same speed as the lure 1. However, since the mass per unit length of the sinker 100c is more (heavier) than that of the sinker 1b, a balance is maintained in a state that the length of the portion of the sinker 100 of the lure 2 in contact with the water bottom is shorter than the length of the portion of the sinker 1b of the lure 1 in contact with the water bottom shown in FIG. 1A.

When the sinker 100 of the lure 2 begins to move upward on a level difference 20a as shown in FIG. 2B, the portion in contact with the water bottom is increased in accordance with the shape of the level difference 20a compared to the time moving on a flat water bottom. At this time, the mass of the sinker 100 of the lure 2 supported by the level difference 20a is increased more rapidly than the mass of the sinker 1b of the lure 1 supported by the level difference 20a shown in FIG. 1B. Thus, a force of pulling the main body 1a downward in accordance with an amount of the sinker 100 of the lure 2 in contact with the water bottom is decreased more rapidly compared to the case of the sinker 1b of the lure 1. Accordingly, the main body 1a of the lure 2 moves upward along the shape of the level difference 20a earlier (i.e., more sharply) than the main body 1a of the lure 1 shown in FIG. 1B. After the sinker 100 of the lure 2 moves upward on the level difference 20a, as shown in FIG. 2C, the sinker 100 of the lure 2 moves on the water bottom 20 in an approximately same state as the state shown in FIG. 2A earlier compared to the case of the sinker 1b of the lure 1 shown in FIG. 1C.

In the present embodiment, the mass per unit length of the sinker 100 is increased intermittently in the direction extending from the main body 1a. However, the sinker is not limited to the above described configuration. As shown in FIG. 4A, it is also possible to configure a sinker 200 of a lure 2-1 by coupling the sinker 100 in opposite direction. Namely, the mass per unit length of the sinker 200 of a lure 2-1 is decreased intermittently in the direction extending from the main body 1a.

In the above described case, a force of pulling the main body 1a downward in accordance with an amount of the sinker 200 of the lure 2-1 in contact with the water bottom is decreased more slowly compared to the case of the sinker 1b of the lure 1 shown in FIG. 1B. Accordingly, the main body 1a of the lure 2-1 moves upward along the shape of the water bottom later (i.e., more slowly) than the main body 1a of the lure 1 shown in FIG. 1B.

Embodiment 3

Figures 3A, 3B, 3C:
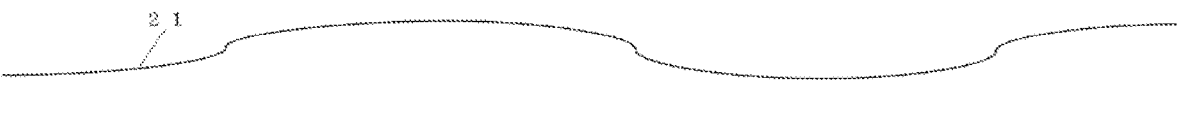
FIGS. 3A to 3C are schematic diagrams showing a lure of an embodiment of the present disclosure where only the sinker coupled to the main body of the lure shown in FIG. 1-1A to 1-1C is replaced with a sinker whose mass per unit length is increased locally and whose entire length is shorter than that of the sinker of the conventional technology.

FIGS. 3A to 3C are schematic diagrams showing a lure of an embodiment of the present disclosure where only the sinker coupled to the main body of the lure shown in FIG. 1-1A to 1-1C is replaced with a sinker whose mass per unit length is increased locally and whose entire length is shorter than that of the sinker of the conventional technology shown in FIG. 1-1A to 1-1C. FIG. 3A shows a state immediately before the lure moves downward over a level difference, FIG. 3B shows a state that the same lure moves downward over the level difference, and FIG. 3C shows a state that the same lure is landed on a water bottom.

Hereafter, an explanation will be made about a sinker 300 of the lure (fishing tackle). Similar to the sinker 1b of the lure 1 of the conventional technology shown in FIGS. 1-1A to 1-1C, a sinker 300 of a lure 3 is coupled to a main body 1a, which is a buoyant body configured to go underwater while receiving a resistance of water. The sinker 300 of the lure 3 is extended downward and can be freely curved except for a sinker 300a. Similar to the sinker 1b of the lure 1, the sinker 300 of the lure 3 is made of materials whose volume are hard to vary due to water pressure. A specific gravity of the sinker 300 is specified to be larger than that of the water body where the lure 3 is used. The sinker 300 of the lure 3 has enough strength not to be broken when the lure 3 is used. It is preferable to use materials as inconspicuous and quiet as possible underwater for the sinker 300. It is also possible to use a material which has an effect of attracting fish or an effect of encouraging predation due to color, luster, light reflection, sound, or the like. A sinker-release device could be provided on a ring 1 where the sinker 300 is coupled to the main body 1a or on an intermediate portion of the sinker 300 so that only the sinker 300 can be cut off and left when the sinker 300 of the lure 3 snags. Here, the sinker 300 to be released is preferably made of a material harmless to the environment.

The entire mass of the sinker 300 of the lure 3 is equal to that of the sinker 1b of the lure 1. The sinker 300 of the lure 3 is configured with the sinker 100b, whose mass per unit length is equal to that of the sinker 1b of the lure 1 and whose thickness (diameter) of the cross-section perpendicular to the extending direction is equal to that of the sinker 1b of the lure 1, except for the sinker 300a located at the lower end of the sinker 300. In addition, the lower end of the sinker 300 of the lure 3 is configured with the sinker 300a, whose mass per unit length is more (heavier) than that of the sinker 1b, whose thickness (diameter) of the cross-section perpendicular to the extending direction is equal to that of the sinker 1b, and which is made of an unbendable material.

Accordingly, although the entire mass of the sinker 300 of the lure 3 is equal to that of the sinker 1b of the lure 1, the entire length of the sinker 300 of the lure 3 is necessarily shorter than that of the sinker 1b of the lure 1 since the sinker 300 is configured with combining the sinker 100b whose mass per unit length is equal to that of the sinker 1b and the sinker 300a whose mass per unit length is more (heavier) than that of the sinker 1b.

Similar to the sinker 1b of the lure 1 shown in FIG. 1-1A, as shown in FIG. 3A, the sinker 300 of the lure 3 moves underwater in a state that a certain amount of the sinker 300 is in contact with the water bottom 20 when the main body 1a is pulled approximately horizontally underwater by the fishing line 10 along a flat water bottom at a suitable and the same speed as the lure 1. However, since the mass per unit length of the sinker 300a is more (heavier) than that of the sinker 1b, a balance is maintained in a state that the length of the portion of the sinker 300 of the lure 3 in contact with the water bottom is shorter than the length of the portion of the sinker 1b of the lure 1 in contact with the water bottom shown in FIGS. 1-1A.

Note that the sinker 100b of the sinker 300 of the lure 3 is preliminarily adjusted to keep its state curved at this time.

After the sinker 300 of the lure 3 reaches a level difference 20b as shown in FIG. 3B, the portion in contact with the water bottom is separated from the water bottom 20 earlier compared to the case of the sinker 1b of the lure 1 since the entire length of the sinker 300 of the lure 3 is shorter than that of the sinker 1b of the lure 1. At this time, the force of pulling the main body 1a downward is increased more rapidly compared to the case of the sinker 1b of the lure 1. Thus, the main body 1a of the lure 3 starts descending earlier (i.e., more sharply) than the main body 1a of the lure 1 shown in FIG. 1-1B.

In addition, the resistance of water received by the sinker 300 of the lure 3 is smaller than that of the sinker 1b of the lure 1 since the entire length is shorter. Accordingly, the lure 3 descends faster (i.e., more quickly) than the lure 1. After the sinker 300 of the lure 3 moves downward over the level difference 20b and lands on the water bottom, as shown in FIG. 3C, the sinker 300 of the lure 3 moves on the water bottom 20 in an approximately same state as the state shown in FIG. 3A earlier compared to the case of the sinker 1b of the lure 1 shown in FIG. 1-1C.

In the sinker 100 of the lure of the present embodiment, although the entire mass and the entire length are equal to those of the conventional technology, the force of pulling the main body of the lure downward in accordance with ups and downs of the water bottom can be adjusted more sharply. In addition, in the sinker 300 of the lure of the present embodiment, although the entire mass is equal to that of the conventional technology, the force of pulling the main body of the lure downward in accordance with ups and downs of the water bottom can be adjusted more sharply, and it is possible to make the lure descend more quickly. Furthermore, in both the sinker 100 of the lure and the sinker 300 of the lure, it is possible to make the lure snag on obstacles more hardly since the length of the portion in contact with the water bottom is shorter compared to the conventional technology. In addition, in the sinker 200 of the lure of the present embodiment, although the entire mass and the entire length are equal to those of the conventional technology, the force of pulling the main body of the lure downward in accordance with ups and downs of the water bottom can be adjusted more slowly.

Embodiment 4

Although the present disclosure is explained based on above embodiments, the present disclosure is not limited to the above described configurations. Although the present disclosure is explained by using the sinker 100, the sinker 200, and the sinker 300 of the lure as sinker for fishing tackle in the above embodiments, the present disclosure is not limited to the above described configurations.

For example, the following configurations can be also adopted. As shown in FIG. 4B, a sinker 1c, which is extended downward from the main body 1a that is a buoyant body configured to go underwater while receiving a resistance of water and can be freely curved, whose mass per unit length and whose thickness (diameter) of the cross-section perpendicular to the extending direction are increased continuously in the direction extending from the main body 1a, and whose force of pulling the main body 1a downward is adjusted in accordance with an amount of the sinker 1c in contact with the water bottom, is configured to separate from the water bottom when moving underwater along a flat water bottom within a suitable speed range. As shown in FIG. 4C, a sinker 1d, whose mass per unit length and whose thickness (diameter) of the cross-section perpendicular to the extending direction are decreased intermittently in the direction extending from the main body 1a, is configured to separate from the water bottom when moving underwater along a flat water bottom just at a very slow speed. As shown in FIG. 4D, a sinker 1e is configured locally (at least partly) with a sinker 300b, which is made of an unbendable material, whose mass per unit length is increased, and whose thickness (diameter) of the cross-section perpendicular to the extending direction is thin.

INDUSTRIAL APPLICABILITY

The present disclosure can be applied to a sinker for an underwater mobile body having any purposes and a sinker for a fishing tackle having any purposes, where the sinker is extended downward from a main body of the underwater mobile body or a main body of the fishing tackle which is a buoyant body configured to go underwater while receiving a resistance of water, which can be freely curved, and whose force of pulling the main body downward is adjusted in accordance with an amount in contact with a water bottom, as long as the operation and effect of the present disclosure can be obtained.

REFERENCE SIGNS LIST

1: lure (fishing tackle); 1a: main body of lure; 1b to 1e: sinker for lure; 2: lure (fishing tackle); 2-1: lure (fishing tackle); 3: lure (fishing tackle); 10: fishing line; 11: ring 1; 20: water bottom; 20a: level difference (upward); 20b: level difference (downward); 21: water surface; 100: sinker for lure; 100a: member of sinker 100 for lure and sinker 200 for lure where thickness (diameter) of cross-section perpendicular to extending direction is equal to that of sinker 1b of lure 1 and mass per unit length is less (lighter) than that of sinker 1b of lure 1; 100b: member of sinker 100 for lure, sinker 200 for lure, sinker 300 for lure, and sinker 1e for lure where thickness (diameter) of cross-section perpendicular to extending direction is equal to that of the sinker 1b of lure 1 and mass per unit length is equal to that of sinker 1b of lure 1; 100c: member of sinker 100 for lure and sinker 200 for lure where thickness (diameter) of cross-section perpendicular to extending direction is equal to that of the sinker 1b of lure 1 and mass per unit length is more (heavier) than that of sinker 1b of lure 1; 200: sinker for lure; 300: sinker for lure; 300a: unbendable component of sinker 300 for lure where thickness (diameter) of cross-section perpendicular to extending direction is equal to that of sinker 1b of lure 1 and mass per unit length is more (heavier) than that of sinker 1b of lure 1; 300b: unbendable component of sinker 1e for lure where thickness (diameter) of cross-section perpendicular to extending direction is thinner than that of sinker 1b of lure 1 and mass per unit length is more (heavier) than that of sinker 1b of lure 1;

The invention claimed is:

1. A fishing tackle having a body and a sinker attached to the body; wherein, when the body is pulled approximately horizontally underwater along a flat water bottom within a predetermined speed range, a part of the sinker is kept in contact with the water bottom, and the sinker keeps a curved shape due to water resistance so that a force of pulling the body downward is adjusted in accordance with an amount of the sinker in contact with the water bottom regardless of water depth, thereby being able to keep the body at a constant height range from the water bottom, wherein
    the body is a buoyant body and configured to go underwater while receiving water resistance, and
    the sinker is extended downward from the body and can be freely curved, wherein
  a mass per unit length of the sinker varies continuously, intermittently, or locally in the extending direction,
    excluding a fishing tackle having a sinker whose mass per unit length varies intermittently or locally in the extending direction, due solely to one or more of the following: (i) the presence of a component for coupling the sinker to the body; (ii) the use of a single type of chain whose mass per unit length varies repeatedly in the same manner in the extending direction; (iii) the inclusion of a sinker-release device coupled on both upper and lower sides thereof and designed to cut off and leave the sinker when the sinker snags; or (iv) the presence of a component for coupling the sinker-release device to the sinker.

2. The fishing tackle according to claim 1, wherein the sinker is configured locally with an unbendable component.

3. The fishing tackle according to claim 2, wherein the mass per unit length of the sinker varies locally in the extending direction.

4. The fishing tackle according to claim 1, wherein the sinker is configured so that the mass per unit length is different between a base end portion, a center portion, and a tip portion in the extending direction.

5. The fishing tackle according to claim 1, wherein the mass per unit length of the sinker varies locally in the extending direction.

6. A fishing tackle having a body and a sinker attached to the body; wherein a force of pulling the body downward is adjusted in accordance with an amount of the sinker in contact with a water bottom regardless of water depth, the body is kept at a constant height range from the water bottom, and when the body is moved approximately horizontally underwater along a flat water bottom within a predetermined speed range by a fishing line, the sinker is separated from the water bottom, wherein the body is a buoyant body and configured to go underwater while receiving water resistance, and the sinker is extended downward from the body and can be freely curved, wherein a mass per unit length of the sinker varies intermittently in the extending direction, excluding a fishing tackle having a sinker whose mass per unit length varies intermittently or locally in the extending direction, due solely to one or more of the following: (i) the presence of a component for coupling the sinker to the body; (ii) the use of a single type of chain whose mass per unit length varies repeatedly in the same manner in the extending direction; (iii) the inclusion of a sinker-release device coupled on both upper and lower sides thereof and designed to cut off and leave the sinker when the sinker snags; or (iv) the presence of a component for coupling the sinker-release device to the sinker.

7. The fishing tackle according to claim 6, wherein the sinker is configured locally with an unbendable component.

8. The fishing tackle according to claim 7, wherein the mass per unit length of the sinker varies locally in the extending direction.

9. The fishing tackle according to claim 6, wherein the mass per unit length of the sinker varies locally in the extending direction.

* * * * *